United States Patent
Hinds

(10) Patent No.: US 6,555,648 B1
(45) Date of Patent: Apr. 29, 2003

(54) TETRAFLUOROETHYLENE PRODUCTS WITH ENHANCED CRYSTALLINITY AND PROCESSES FOR PRODUCING THE SAME

(76) Inventor: Cyril Hinds, Drawer AA, Lafayette, LA (US) 70502

( * ) Notice: Subject to any disclaimer, the term of this patent is extended or adjusted under 35 U.S.C. 154(b) by 0 days.

(21) Appl. No.: 09/949,682

(22) Filed: Sep. 10, 2001

(51) Int. Cl.$^7$ .................................................. C08F 6/00
(52) U.S. Cl. ...................................... 528/481; 509/590
(58) Field of Search ........................... 528/481; 508/590

(56) References Cited

U.S. PATENT DOCUMENTS 4,760,198 A * 7/1988 Bierschenk et al. ........ 568/615

* cited by examiner

*Primary Examiner*—Terressa M. Boykin
(74) *Attorney, Agent, or Firm*—The Matthews Firm

(57) ABSTRACT

A process for producing a degraded derivative tetrafluoroethylene product. A batch of solid tetrafluoroethylene material is placed in a structure having a cavity with the structure formed from a metal such as aluminum. The batch is heated in the structure with a temperature of between 1000 degrees Fahrenheit to 2000 degrees Fahrenheit. At least portion of the batch is removed from the upper end of the structure as the portion passes from a solid to a liquid phase. The portion is allowed to cool and re-solidify into a degraded derivative tetrafluoroethylene product.

39 Claims, 5 Drawing Sheets

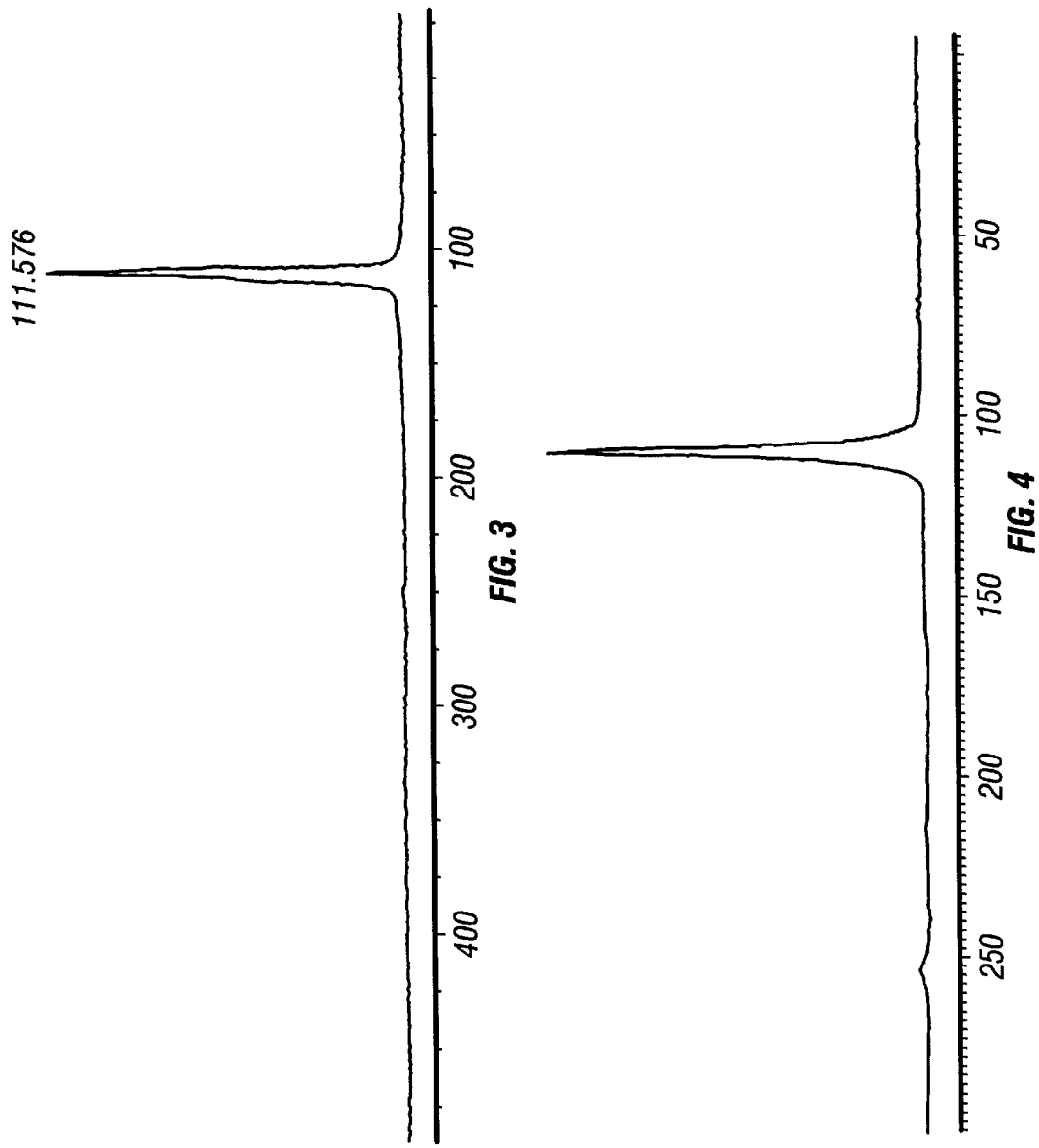

TETRAFLUOROETHYLENE PRODUCTS WITH ENHANCED CRYSTALLINITY AND PROCESSES FOR PRODUCING THE SAME

TECHNICAL FIELD

The present invention generally relates to new tetrafluoroethylene products with enhanced crystallinity and processes for producing the same.

BACKGROUND ART

For purposes of this patent, the following terms are defined. As used herein, the term "sintered" means and refers to being subjected to compression. As used herein, the term "lubricant" or "lubricants" means and refers to a substance or substances that reduces(s) friction between moving parts and/or provide(s) cooling for moving parts. The characteristics of a lubricant are well known in the art and are fully incorporated herein. As used herein, the term "unsintered" means and refers to not being subjected to pressure. As used herein, the term "TFE" means and refers to tetrafluoroethylene (the chemical formula is $C_2F_4$). As used herein, the term "PTFE" means and refers to polytetrafluoroethylene (the chemical formula is $(C_2F_4)_n$ where n is any number). As used herein, the term "partially degraded TFE" means and refers to commercially available degraded TFE.

Certain terms used in the lubrication art and/or lubricant art have identified meanings. As used herein, the term "burnish" or "burnished" or "burnishing" means and refers to polishing and/or wiping of a lubricant to a surface or asperities. As used herein, the term "asperities" means and refers to tiny imperfections, ridges or projections on wear surfaces. As used herein, the term "wear surface" or "wear surfaces" means and refers to an area of at least two surfaces in contact or close to contact. As used herein, the term "boundary" means and refers to an area of contact between surfaces. As used herein, the term "boundary period" means and refers to a period of time where surfaces are in contact without a lubricant. As used herein, the term "boundary lubrication" means and refers to a character of lubrication between surfaces. Heat of fusion means and refers to an increase in internal energy that is required to convert a solid to a liquid. Conversely, a reduction in internal energy can cause liquids to freeze or solidify. The heat of fusion of a substance is the heat exchange required to melt one gram of the substance (calories/gm).

Tetrafluoroethylene is well known and used for a variety of purposes. One of the greatest uses for tetrafluoroethylene is as a solid lubricant. As a lubricant, tetrafluoroethylene performs well as compared to natural lubricants and synthetic lubricants. Both natural and synthetic lubricants may be found either as liquids, semi-liquids, solids, and/or amorphous solids. Generally, examples of natural lubricants include such items as, but are not limited to, organic oils, mineral oils, grease and graphite.

Many lubricants are designed to burnish wear surfaces to improve the boundary lubrication and reduce the boundary period. Other lubricants have been developed to protect a surface from abrasion, water damage, and the like by burnishing a lubricant on the surface. Further, other lubricants have been developed as nucleating fillers for a variety of thermoplastics.

As stated, one of the most popular and widely used lubricants is PTFE (or polymerized tetrafluoroethylene), which is the subject of U.S. Pat. No. 2,230,654. The product became known as TEFLON. This product has been noted as having superior lubricating properties, primarily because of its low coefficient of friction. Many uses have developed for this product, including, but not limited to, utilizing the material as a solid or as a dispersed solid in a carrier. As well, this product has been shown to be resistant to a wide variety of chemical attacks and thus very resilient once applied.

Other notable and desirable properties of TEFLON are:
1) TEFLON is Non-polar. The carbon backbone of PTFE is completely covered by the "electron cloud" of Fluorine atoms. This covering, and the angles at which the Carbon-Fluorine bonds are disposed, causes the center of electronegativity and electropositivity to be perfectly balanced through the polymer cross section. As a result no net charge difference prevails.
2) The Bond Strength of TEFLON is high. Carbon-Fluorine and Carbon-Carbon bonds are among the strongest in single bond organic chemistry.
3) TEFLON has a high degree of polymerization. The chains are most commonly very long and substantially unbranched. The low interpolymer chain attraction requires very long chain lengths in order to tangle and form together.
4) TEFLON has high thermal stability. The strength of the Carbon-Fluorine bond and the Carbon-Carbon bond translates into a relatively high heat of fusion.
5) TEFLON is relatively insoluble in normal conditions.
6) TEFLON demonstrates superb inertness to chemical and biological attack. The bonds do not react with most chemicals, Alkali metals being a notable exception.
7) TEFLON is flame resistant. TEFLON will burn, but only when in direct flame.
8) TEFLON is inert. So long as the TEFLON is not being incinerated, it can be disposed of with industrial and domestic waste. TEFLON is only harmful when heated above 400 degrees Celsius where it gives off tetrafluoroethylene, hexafluoroethylene, hexapropylene, and other fluoro compounds and toxic fumes.
9) TEFLON has low water absorbtivity. TEFLON predominantly only absorbs water after the TEFLON has been in the water long enough for the water to become physicochemically associated with the polymer chains.

While there are several formulations of TEFLON, the most common form is PTFE. Other forms include FEP and PFA. The following chart gives generally accepted values for various properties of these three forms of TEFLON.

|  | Units | TEFLON; PTFE | TEFLON; FEP | TEFLON; PFA |
|---|---|---|---|---|
| Mechanical Properties: | | | | |
| Specific Gravity | | 2.13–2.22 | 2.15 | 2.15 |
| Tensile Strength | Psi | 2,500–4000 | 3,400 | 3,600 |
| Elongation | % | 200–400 | 325 | 300 |
| Flexural Modulus | Psi | 27,000 | 90,000 | 90,000 |
| Impact Strength | Ft·lb/in | 3.5 | No break | No break |
| Hardness | Shore D | 50–65 | 56 | 60 |
| Coefficient of Friction Dynamic | <3 m/min <10 ft/min | 0.1 | 0.2 | 0.2 |
| Thermal Properties: | | | | |
| Melting Point | °C. | 327 | 260 | 305 |
| | °F. | 621 | 500 | 592 |
| Upper Sevice Temp (20,000 | °C. | 260 | 204 | 260 |
| | °F. | 500 | 400 | 500 |

-continued

|  | Units | TEFLON; PTFE | TEFLON; FEP | TEFLON; PFA |
|---|---|---|---|---|
| hours) |  |  |  |  |
| Flame Rating |  | VO | VO | VO |
| Limiting Oxygen Index | % | >95 | >95 | >95 |
| Heat of Combustion | Btu*lb | 2,200 | 2,300 | 2,300 |
| Electrical Properties: |  |  |  |  |
| Dielectric Constant | 1 Mhz | 2.1 | 2.1 | 2.1 |
| Dissipation Factor | 1 Mhz | 0.0001 | 0.0007 | 0.0001 |
| Arc Resistance | Sec | >300 | >300 | >180 |
| General Properties: |  |  |  |  |
| Weather Resistance | Years unaffected | 20 | 20 | 20 |
| Chemical/Solvent Resistance |  | Outstanding | Outstanding | Outstanding |
| Water Absorption (24 hours) | % | <.01 | <.01 | <.03 |

The '654 patent states that polymeric tetrafluoroethylene white powders, brown powders, and/or jellies that are insoluble in hot or cold water, acetone, ether, petroleum ether, ethyl alcohol, iso-amyl alcohol, carbon tetrachloride, dichlorobenzene, ethyl acetate, pyridine, nitrobenzene, 30% NaOH, petroleum oil, glacial acetic acid, concentrated sulfuric acid, concentrated nitric acid and the like. However, this polymeric material has only been the starting point for a wide variety of further processes and apparatuses that have attempted to improve the characteristics of the polymer. However, the art filed is in search of processes and/or methods for further improving the characteristics and/or properties of PTFE and/or TFE.

PTFE is generally a white thermoplastic material. As disclosed, depending upon the grade of PTFE, the melting point is generally about 565 degrees Fahrenheit to about 655 degrees Fahrenheit. In its natural state, PTFE has a tendency to agglomerate. Therefore, several methods have been developed in the art field to sinter the PTFE to reduce its agglomeration. Generally, a process that has attempted to reduce the agglomeration characteristics of PTFE has been referred to as attempting to degrade the PTFE (change its crystallinity). However, heretofore, no process has been developed that fully degrades PTFE and/or change the crystallinity as the present invention. In fact, consumers are best to be warned that when purchasing a degraded TFE product from any source, the percent degradation should be verified.

A prior art method of processing and using PTFE has involved the thermal degradation of the PTFE at a temperature in the range of 565 degrees Fahrenheit to 1150 degrees Fahrenheit. While processes of this type have been shown to improve certain characteristics of the PTFE, the partially degraded PTFE still has a tendency to agglomerate. Further, sintering such partially degraded PTFE does reduce the agglomeration, but the sintered product has been extremely hard to commute to a fine particle size less than about five (5) micron particle size, as is illustrated in the article titled "Effect of PTFE Particle Size on Wear and Coefficient of Friction" by Ballester et al., presented at the NLGI 2000 67th Annual Meeting, in paper #0025. Accordingly, the art field is in search of processes for treating PTFE to enable it to improve its characteristics and enable it to be ground to a low micron particle size. In fact, the paper proposes that sintered PTFE can only be ground to average micron sizes of less than five (5) when high doses of irradiation are used. The following table illustrates prior art conception of degradation as it relates to particle size:

| Sx Designation | Mrad Dosage Index | Avg. ($\mu$) | Range ($\mu$) | @10% ($\mu$) | @50% ($\mu$) | @90% ($\mu$) |
|---|---|---|---|---|---|---|
| Unsintered | 3 | 0.8 | 0.1 to 15.1 | 0.2 | 0.3 | 2.3 |
| Sintered | 10 | 4.2 | 0.5 to 12.1 | 1.7 | 3.9 | 7.2 |
| Sintered | 6 | 20.5 | 0.5 to 36.3 | 3.6 | 12.3 | 43.9 |
| Sintered | 1 | 46.8 | 0.4 to 417 | 5.6 | 33.1 | 104.6 |

As is illustrated, the prior art taught that obtaining a sub micron size degraded PTFE derivative product was best obtained with an unsintered virgin white paste. The art has taught that to obtain submicron particle size for sintered PTFE stock, high doses of irradiation are necessary whereas only low to moderate doses are required for unsintered stock to obtain smaller submicron particle size. There is no teaching that thermal treatment of a PTFE stock material can produce a degraded tetrafluoroethylene product with submicron particle size after grinding.

However, the art field has taught away from further heat treatment degradation (changing crystallinity) of a PTFE derivative and has instead concentrated upon irradiation of PTFE. However, such irradiation has only sterilized the PTFE and not at least partially degraded it. Examples of such irradiation treatment of PTFE may be found in U.S. Pat. No. 3,878,164 (the '164 patent), U.S. Pat. No. 3,766,031 (the '031 patent), U.S. Pat. No. 4,029,870 (the '870 patent), U.S. Pat No. 4,220,511 (the '511 patent), U.S Pat. No. 4,748,005 (the '005 patent), U.S. Pat. No. 4,777,192 (the '192 patent), U.S. Pat. No. 5,891,573 (the '573 patent), U.S. Pat. No. 5,968,997 (the '997 patent), U.S. Pat. No. 4,036,718 (the '718 patent), U.S. Pat. No. 3,766,031 (the '031 patent), and U.S. Pat. No. 4,052,278 (the '278 patent). However, none of these patents have produced a degraded derivative tetrafluoroethylene product and thus have not produced an improved degraded derivative tetrafluoroethylene product as is produced by the apparatuses and processes of the present invention.

For example, the '031 patent states that the heat treating of PTFE should be avoided because of discoloring of the heat treated product. The '031 patent states that an application of a critical dose of ionizing radiation to the product renders the product capable of comminution to fine particle size. However, the product produced by this process is not at least partially degraded (changed crystallinity) and has not attained an improvement in its lubricant characteristics as the present invention. Accordingly, the art field is in search of a process and apparatus for the heat treating of PTFE for full degradation of the product to obtain a crystallinity whereby the product is not discolored and the lubricant characteristics are improved.

The '870 patent teaches and discloses an irradiation process for PTFE to obtain a small particle size. The '870 patent further states that the heat treatment of PTFE is undesirable for producing fine particle size of less than 5 microns. Accordingly, the art field is in search of a method of thermally degrading PTFE and/or changing the crystallinity whereby the product is capable of being ground to a particle size of less than 5 microns and has superior lubricity characteristics.

The '511 patent teaches and discloses partially degrading PTFE through the use of concurrent or countercurrent heat treatment and irradiation to produce a fine particle size inert product capable of being used as a lubricant in inks. The patent teaches that as the PTFE is degraded the products molecular weight will be reduced. However, the product produced by such method is not as degraded as the present invention nor is the crystallinity altered as in the present invention. As well, the prior art has not produced a PTFE product and/or a PTFE derivative product that can be burnished on a surface. Furthermore, the patent cautions that the PTFE should not be heated much above its melting point during heat treatment. Accordingly, the art field is in search of a method of fully degrading PTFE and/or changing the crystallinity whereby the product is essentially inert with improved lubricant properties.

A further example of how the art field has taught away from the heat treating of PTFE for degradation (changing crystallinity) is disclosed in the '718 patent. The '718 patent discloses that the prior art heat treating methods produced a product that was not capable of being milled or ground to a particle size below about 5 microns. The patent states that an irradiation treatment of the PTFE will produce a friable product that is capable of being ground to less than a 5 micron particle size. However, the patent does not produce a product that is at least partially degraded of that has the crystallinity of the present invention. Accordingly, the art field is in search of a process for heat treating PTFE for degradation to alter the crystallinity whereby the product may be milled or ground to a particle size of less than 5 microns and exhibit enhanced lubricity characteristics.

Various other patents describe uses and compositions of PTFE and/or its derivatives. Examples of such patents are U.S. Pat. No. 4,834,894 (the '894 patent), U.S. Pat. No. 4,888,122 (the '122 patent), U.S. Pat. No. 5,296,165 (the '165 patent), and U.S. Pat. No. 5,898,022 (the '022 patent). The '894 patent and the '122 patent teach and disclose the dispersion of PTFE in an oil for an improved reduction in friction. The '165 patent teaches and discloses the coating of a substance with a PTFE co-polymerized product for improved stainproofing, sliding, and corrosion resistant properties. The '022 patent teaches and discloses a complex formulation including PTFE for the reduction of friction and repelling of moisture. However, none of these patents teach the use of a degraded derivative tetrafluoroethylene product with changed, enhanced crystallinity, improved lubricity and associated characteristics.

The prior art has recognized the benefits of degrading PTFE to improve the products lubricity characteristics. However, the art field has taught that thermal degradation of the product will not produce a at least partially degraded product that may be ground to a particle size of less than 5 microns that exhibits improved lubricant characteristics. Contrary to the teachings of the art, unexpected results of a degraded derivative tetrafluoroethylene product with changed and/or enhanced crystallinity that can be ground or milled to a particle size of less than 5, may be obtained by the various embodiments of the processes and apparatuses disclosed in this present invention through thermal degradation and/or gas mixing.

SUMMARY OF THE INVENTION

The present invention generally relates to processes and apparatuses for the production of a tetrafluoroethylene derivative product with enhanced crystallinity and processes for producing the same. The enhanced crystallinity of the at least partially degraded tetrafluoroethylene derivative product of the present invention imparts unexpected properties of higher heats of fusion than that of ordinary tetrafluoroethylene and/or its derivative products. The new crystalline product has improved lubricity and/or burnishing properties as compared to prior art polymerized tetrafluoroethylene.

This summary is not intended to be a limitation with respect to the features of the invention as claimed and any examples are merely intended as embodiments, and the scope and other objects can be more readily observed and understood in the detailed description of an embodiment and the claims.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a chromatogram of a Nuclear Magnetic Resonance Image of a standard TEFLON product.

FIG. 4 is a chromatogram of a Nuclear Magnetic Resonance Image of a degraded derivative tetrafluoroethylene product of the present invention.

GENERAL DESCRIPTION AND PREFERRED MODE FOR CARRYING OUT THE INVENTION

For purposes of the description of this invention, the terms "upper", "lower", "right", "left", "vertical", "horizontal", "top", "bottom", and other related terms shall be defined as to relation of embodiments of the present invention as it is shown an illustrated in the accompanying Figures. Further, for purposes of the description of this invention, the terms "upper portion," "lower portion," "top," "bottom," and the like shall be defined to mean an upper portion and a lower portion and not specific sections. However, it is to be understood that the invention may assume various alternative structures and processes and still be within the scope and meaning of this disclosure. Further, it is to be understood that any specific dimensions and/or physical characteristics related to the embodiments disclosed herein are capable of modification and alteration while still remaining within the scope of the present invention and are, therefore, not intended to be limiting.

The present invention, through various apparatuses, systems, and processes produces a degraded tetrafluoroethylene derivative product with enhanced crystallinity as compared to the prior art degraded, modified, and unmodified tetrafluoroethylene. Processes of the present invention use tetrafluoroethylene ("TFE") and poly-tetrafluoroethylene ("PTFE") as a starting material. The product produced is a dry solid lubricant with enhanced crstallinity. The enhanced crystallinity results in enhanced heat of fusion values. As well, products of the present invention have increased lubricity as compared to prior art tetrafluoroethylene products and/or its derivatives.

It is known in the art that standard PTFE has a crystalline heat of fusion of 57.4 Joules/gram for 100% crystalline PTFE. However, achieving 100% crystallinity of the polymerized tetrafluoroethylene has not been attained. DuPont has reported maximum crystalline heats of fusion for crystalline tetrafluoroethylene at 48.7 Joules/gram. This translates to a crystallinity of about 85%. Embodiments of the present invention produce a degraded derivative tetrafluoroethylene product with an enhanced crystallinity that imparts a heat of fusion of about 50.0 Joules/gram to about 65.0 Joules/gram in a granular state. Embodiments of the present invention in a plug form have enhanced heats of fusion of about 60.0 Joules/gram to about 75.0 Joules/gram.

An embodiment of the present invention is generally formed by loading an amount of sintered TFE in an environment heated to about 700 to about 2000 degrees Fahrenheit, removing the sintered TFE as it is liquified from the heated environment, and allowing the liquified TFE to solidify into a product. Such embodiment(s) may be formed by material common in the art as is illustrated below.

Figure 1:
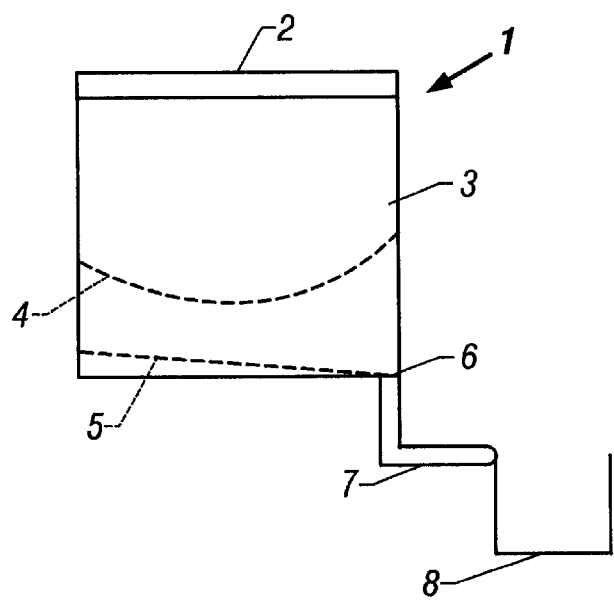
FIG. 1 is an illustration of an embodiment of an apparatus capable of forming an embodiment of the present invention.

Referring now to FIG. 1, an illustration of a system for producing a degraded derivative tetrafluoroethylene product of the present invention, the general structures required for producing a degraded derivative tetrafluoroethylene product may be observed. A system 1 for producing a degraded derivative tetrafluoroethylene product may generally be constructed of a cavity structure 3, a closure 2, a drain 7, and a sintered TFE or PTFE starting material. However, other embodiments may utilize an un-sintered TFE or PTFE starting material.

Cavity structure 3 may be any structure capable of being heated and/or withstanding heat of about 2000 degrees Fahrenheit (about 1093 degrees Centigrade) during the process, having a cavity, such as an oven, a kiln, a container, and the like. However, other materials with lower melting points may be used for processes utilizing lower temperatures. In an embodiment, the temperature of cavity structure 3 is between about 700 to 2000 degrees, Fahrenheit (about 371 to about 1093 degrees Centigrade) in the interior of cavity structure 3. In another embodiment, the temperature of cavity structure 3 is between about 1200 to about 1900 degrees Fahrenheit (about 649 to about 1038 degrees Centigrade) in the interior of cavity structure 3. In another embodiment, the temperature of cavity structure 3 is between about 1400 and about 1700 degrees Fahrenheit (about 809 to about 927 degrees Centigrade) in the interior of cavity structure 3. In another embodiment, the temperature of cavity structure 3 is about 1500 degrees Fahrenheit (about 816 degrees Centigrade) in the interior of cavity structure 3. However, embodiments of the present invention are not limited to the specific embodiments described and/or illustrated and any like structure having a cavity capable of withstanding the temperature given will suffice. Closure 2 is a lid. In an embodiment, closure 2 is constructed of the same material as cavity structure 3. In another embodiment, closure 2 is constructed of a different material. Closure 2 provides selective access and a seal to an interior of cavity structure 3. Closure 2 may be attached to cavity structure 3 in any manner common in the art. In another embodiment, closure 2 rests on a portion of cavity structure 3 and may be lifted or removed for access to the interior of cavity structure 3. In an embodiment, closure 2 completely seals a portion of cavity structure 3. In another embodiment, closure 2 partially seals cavity structure 3. In another embodiment, closure 2 is a door on a side of cavity structure 3. In the various embodiments where closure 2 is a door, closure 2 may be attached by any method or structure common in the art such as a flange, a hinge, and the like. Drain 7 is connected a portion of cavity structure 3. Drain 7 may be connected by any manner common in the art. In an embodiment, drain 7 is in communication with cavity structure 3 about a lowest point on cavity structure 3.

The temperature chosen is a matter of design choice. It has been found that the lower the temperature, the longer the process is required to produce degraded derivative tetrafluoroethylene product of the present invention. The times for the conversion of tetrafluoroethylene to a degraded derivative tetrafluoroethylene product of the present has been found to be longer for lower temperatures and shorter for higher temperatures.

Various other embodiments of the present invention may incorporate a variety of additional structures as are illustrated, but not limited to, structures depicted in FIG. 1. System 1 may have an interior screen extending across a portion of the interior of cavity structure 3. In an embodiment, screen 4 extends completely across the interior of cavity structure 3. In another embodiment, screen 4 extends partially across the interior of cavity structure 3. In another embodiment, screen 4 is a container that has an opening along a portion of the container. In an embodiment of the container, the opening is along an end. In another embodiment of the container, the opening is at a lowermost portion of the container. System 1 may also have a slanted bottom 5 or a slanted false bottom. Slanted bottom 5 may be any structure common in the art for channeling or funneling a liquid. In an embodiment, slanted bottom 5 channels liquified degraded derivative tetrafluoroethylene product of the present invention as the degraded derivative tetrafluoroethylene product of the present invention melts toward drain 7. System 1 may also have a collection plate 8 or tank for collecting the liquified degraded derivative tetrafluoroethylene product as it melts. In an embodiment, plate 8 is a container where the degraded derivative tetrafluoroethylene product may cool and re-solidify.

It is important that the cavity 3 be constructed of a metal material such as Aluminum. It is hypothesized that when cavity 3 is constructed of a metal material, it acts as a thin film catalyst for the conversion of raw material to a degraded derivative tetrafluoroethylene product under the conditions herein disclosed.

In an embodiment, cavity 3 is an inverted cone or other similar structure that is heated by a hot air source. In another embodiment, cavity 3 may be a dual cone structure of a first and a second cone such that a raw material, preferably a sintered tetrafluoroethylene material, may be loaded on the inside of the interior cone (first cone) and heated by hot air passing between the first cone and the second cone causing only a portion of the raw material to be melted and pass through a drain about the apex of the inverted cone(s).

A resolidified degraded derivative tetrafluoroethylene product that is liquified in an environment of about 1200 to about 2000 degrees Fahrenheit (about 649 to about 1093 degrees Centigrade) is a product of the present invention that displays enhanced crystallinity characteristics. The product produced is a degraded derivative tetrafluoroethylene product.

Figure 2:
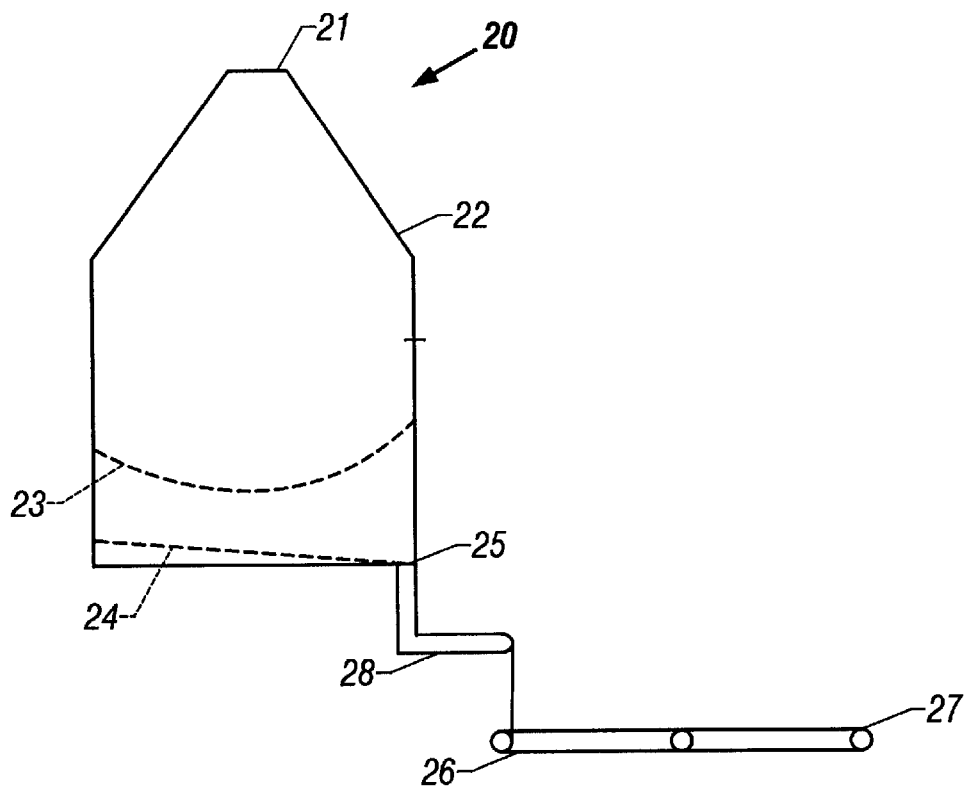
FIG. 2 is an illustration of an alternate embodiment of an apparatus capable of forming an embodiment of the present invention.

Now referring to FIG. 2, and illustration of an alternate embodiment of the present invention, an ability of the present operation to be operated on a continual bases may be seen. Embodiment 20 discloses an opening 21, cavity structure 22, drain 25 and conveyor 26. In various embodiments, opening 21 may be left open during a continuous operation. Heat loss through opening 21 may be minimized by shaping at least a portion of embodiment 20 of cavity structure 22 in an inverse funnel orientation. As in various other embodiments, the interior of cavity structure 22 may have a screen 23 and/or a sloped floor or tilted surface 24. Further various embodiments may utilize a conveyor 27 to collect a liquified and/or solidified product from cavity structure 22 and convey the product or products from cavity structure 22. However, various other embodiments may utilize different structures and or procedures for establishing a continuous process and/or collecting a product and still be within the scope of the present invention.

The present invention also discloses processes for forming a degraded derivative tetrafluoroethylene product that exhibits enhanced lubricity characteristics. Processes of the present invention include the steps of heating an environment to the temperature ranges disclosed above, loading an amount of raw material in the heated environment, withdrawing a degraded derivative tetrafluoroethylene product from the heated environment as the raw material melts, and allowing the degraded derivative tetrafluoroethylene product to re-solidify. Additionally, various additives, carriers, and/or conditioners can be added to the degraded derivative tetrafluoroethylene product to alter its characteristics. For example, and not by way of limitation, color additives may be added to alter the appearance of the product; oils may added to the degraded derivative tetrafluoroethylene product to alter the physical characteristics, and/or other carriers for supplying the degraded derivative tetrafluoroethylene product. embodiments of the present invention has re-solidified, the product(s) may be used as a lubricant. However, other embodiments of the degraded derivative tetrafluoroethylene product may compress or sinter the degraded derivative tetrafluoroethylene product for ease of handling. In such an embodiment, the degraded derivative tetrafluoroethylene product may be applied directly on a desired surface. Other embodiments may grind the degraded derivative tetrafluoroethylene product to various sizes from a fine grind of less than 5 microns to a coarse grind of greater than 5 microns.

In use, whether the re-solidified degraded derivative tetrafluoroethylene product and/or the compressed or sintered degraded derivative tetrafluoroethylene product, improved lubricity and reated results are realized by burnishing the degraded derivative tetrafluoroethylene product on a surface, boundary, wear surface, or the like. Certain advantages of the degraded derivative tetrafluoroethylene products of the present invention are that they have been found not to run, smear, smudge, streak, and the like as compared to conventional petroleum products. Further benefits have been observed in that a surface burnished with the various embodiments of the degraded derivative tetrafluoroethylene product of the present invention repel water and resist contact of the water with the burnished surface. As well, embodiments of the present invention, after burnishing, have been found to greatly reduce, if not eliminate, the boundary period by improving boundary lubrication thus potentially greatly extending the life, appearance, functionality, and the like of the surface burnished.

The present invention has application in all ranges of lubrication from squeaky hinges to motor engines and other fast moving, high precision instruments. Furthermore, the ability of the present invention to be ground to particle sizes of less than 5 microns enables the degraded derivative tetrafluoroethylene product to be added to other solutions as a lubricity enhancing additive.

The exact mechanism by which this process occurs is presently unknown. However, examples below allow for a further understanding of the benefits of the degraded derivative tetrafluoroethylene products produced by embodiments of the present invention.

For a further understanding of the present invention, reference should be had to the two following examples.

EXAMPLE 1

A laboratory experiment was conducted comparing a standard TEFLON (PTFE) and two degraded derivative tetrafluoroethylene products of the present invention, one in plug form and of one in powder form. First a Nuclear Magnetic Resonance (NMR) scan was performed on the sample of standard TEFLON and on the degraded derivative tetrafluoroethylene product. Then a Differential Scanning Calorimeter scan was conducted on both samples to determine the level of crystallinity. The results are reproduced in the table below.

| Sample | Sample Number | NMR (ppm) Most prevalent Peak | DSC (Joules/gram) Crystalline Heat of Fusion |
|---|---|---|---|
| Standard TEFLON | 1 | 111 | 25.7 |
| | 2 | 111 | 27.6 |
| Granular Sample of the Present Invention | 1 | 111 | 57.7 |
| | 2 | 111 | 59.0 |
| Plug Sample of the Present Invention | 1 | 111 | 68.6 |
| | 2 | 111 | 70.5 |

Figure 5:
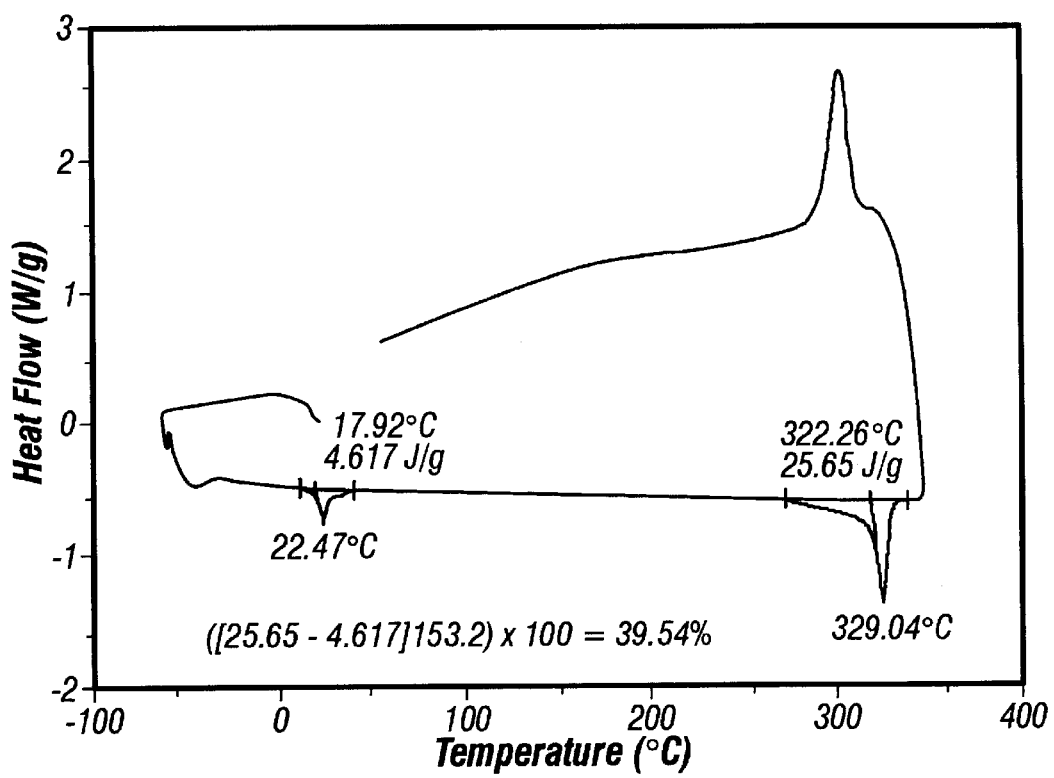
FIG. 5 is a first chromatogram of a Differential Scanning Calorimeter Image of a standard rod TEFLON product.
Figure 6:
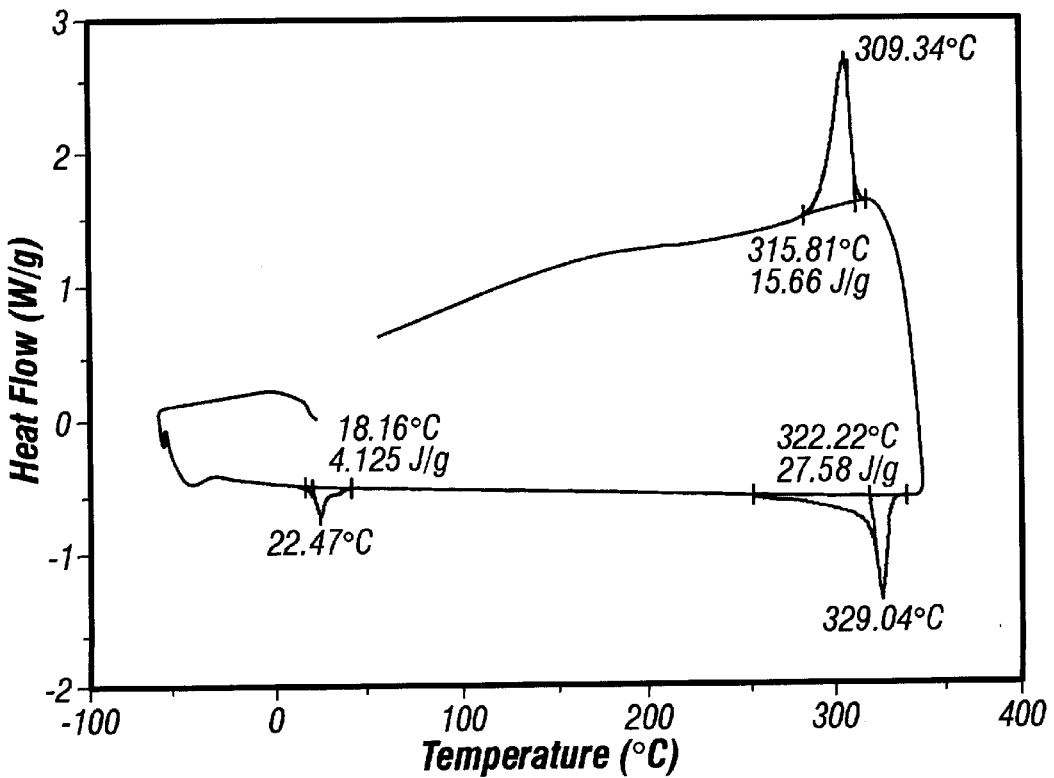
FIG. 6 is a second chromatogram of a Differential Scanning Calorimeter Image of a standard rod TEFLON product.
Figure 7:
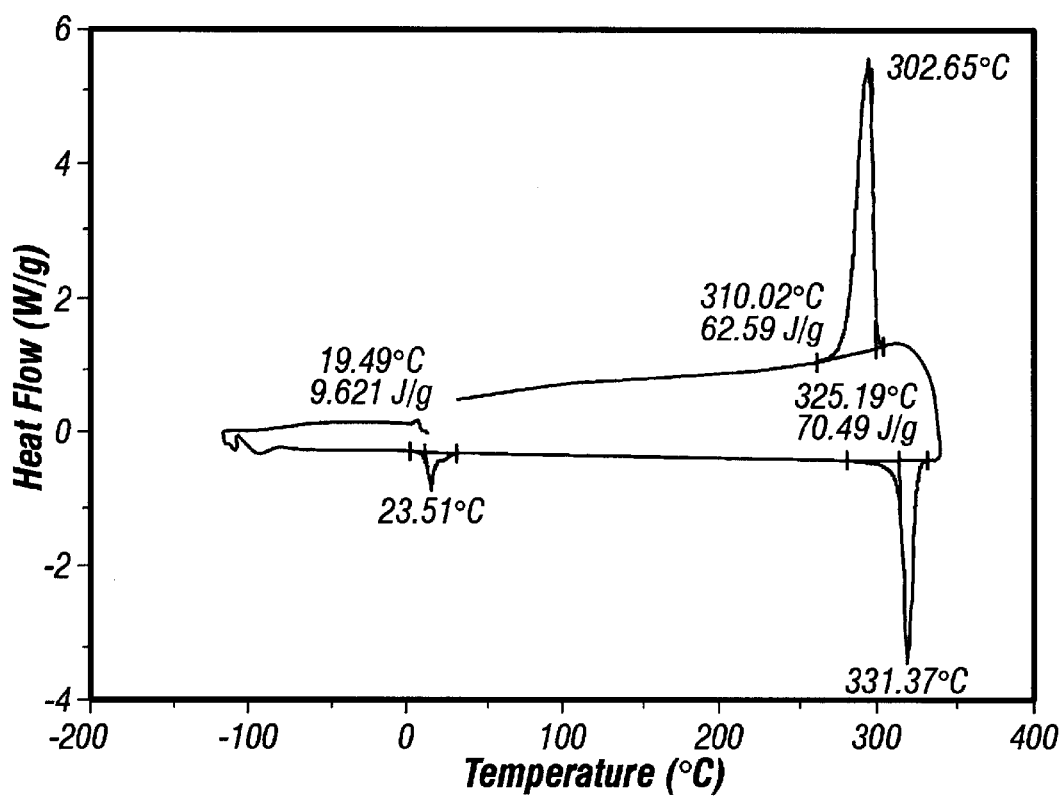
FIG. 7 is a first chromatogram of a Differential Scanning Calorimeter Image of a degraded derivative tetrafluoroethylene plug product of the present invention.
Figure 8:
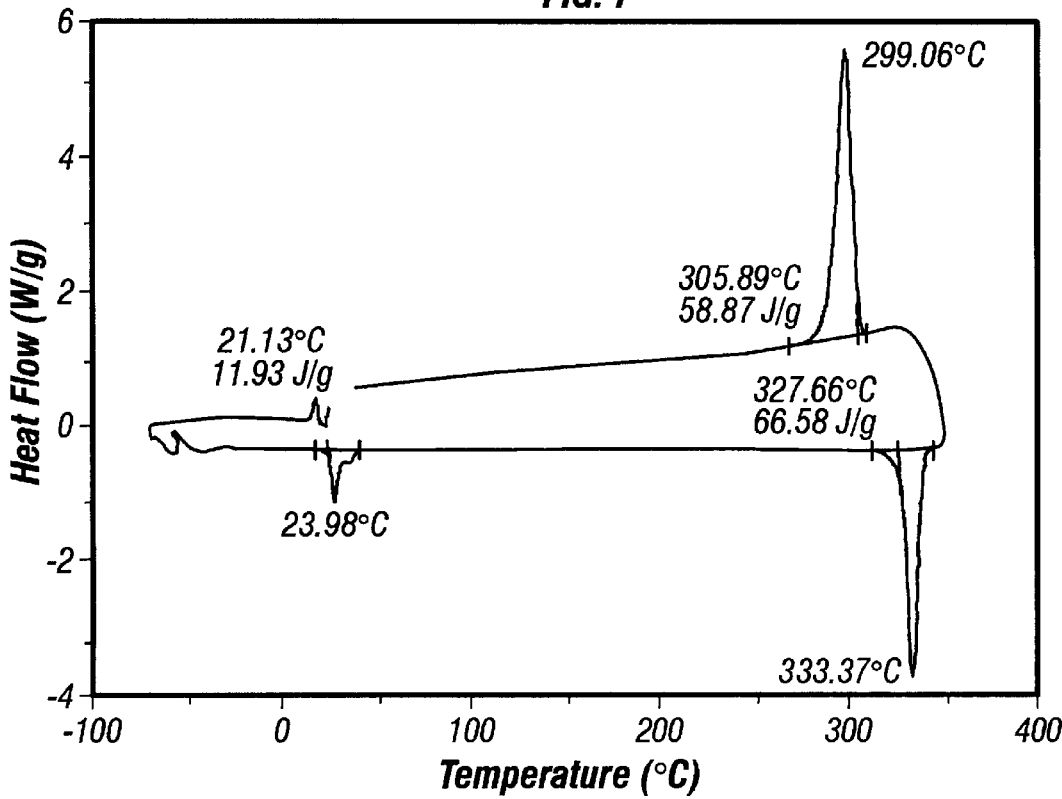
FIG. 8 is a second chromatogram of a Differential Scanning Calorimeter Image of a degraded derivative tetrafluoroethylene plug product of the present invention.
Figure 9:
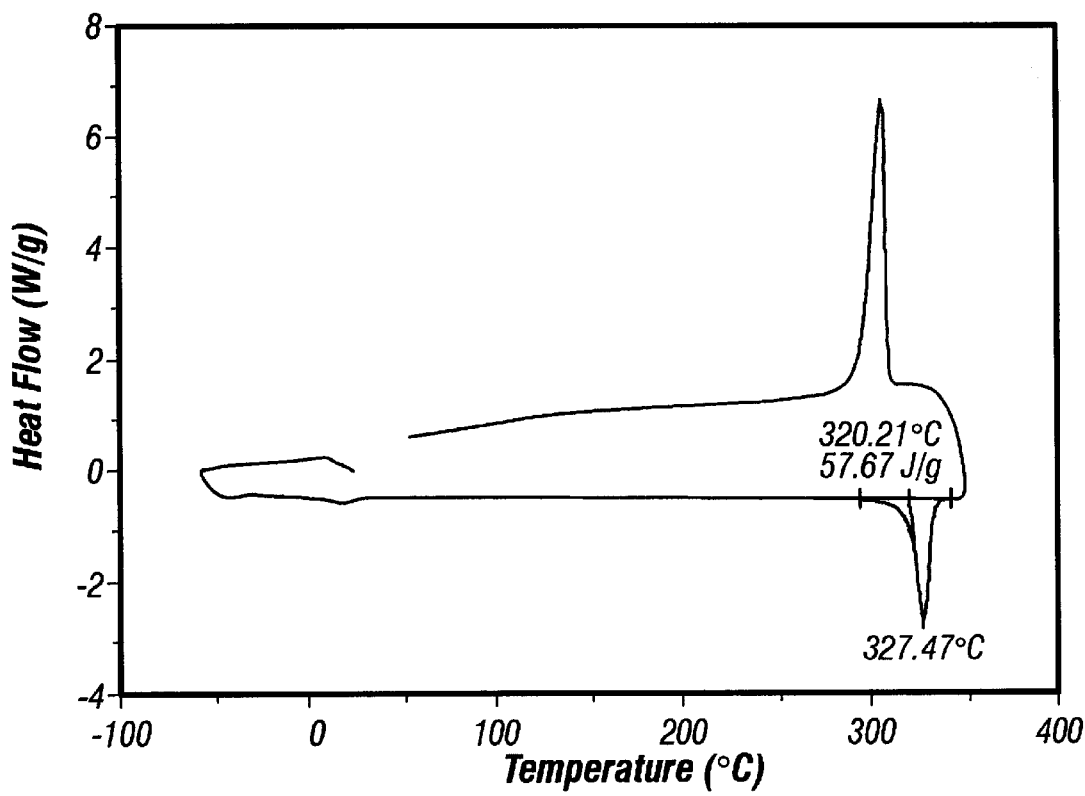
FIG. 9 is a first chromatogram of a Differential Scanning Calorimeter Image of a degraded derivative tetrafluoroethylene granular product of the present invention.
Figure 10:
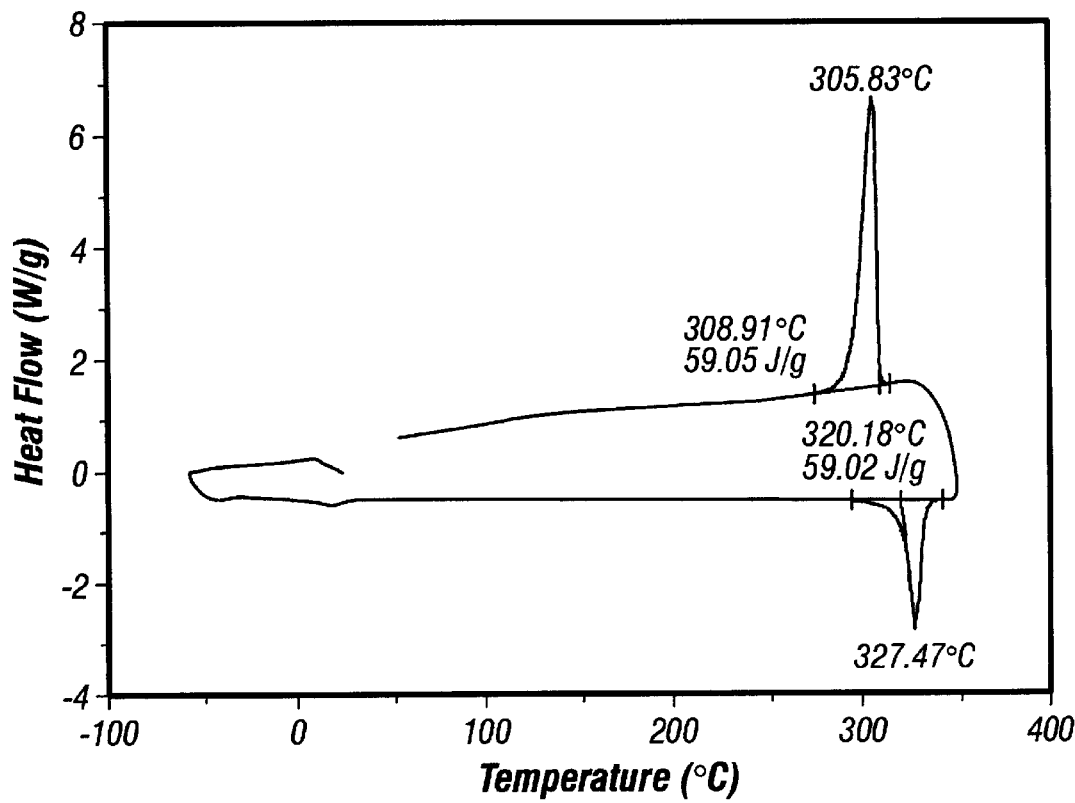
FIG. 10 is a second chromatogram of a Differential Scanning Calorimeter Image of a degraded derivative tetrafluoroethylene granular product of the present invention.

As can be seen from the table above, the standard TEFLON (FIG. 3) and the degraded derivative tetrafluoroethylene product of the present invention (FIG. 4) show an identical peak at 111 ppm, indicating that the chemical structure of both of these materials are nearly identical under NMR technique. However, the DSC scans are different for standard rod (plug) TEFLON (FIGS. 5 and 6) as compared to the degraded derivative tetrafluoroethylene plug products of the present invention (FIGS. 7 and 8) and the degraded derivative tetrafluoroethylene granular products of the present invention (FIGS. 9 and 10), indicating that the degraded derivative tetrafluoroethylene products of the present invention has a new crystalline structure.

The degraded derivative tetrafluoroethylene product of the present invention has an enhanced lubricity about seven points above that of standard TEFLON.

EXAMPLE 2

The degraded derivative tetrafluoroethylene product of the present invention has been found useful for the following purposes, however, the degraded derivative tetrafluoroethylene product of the present invention is not limited to such uses and others will be readily apparent to those of ordinary skill in the art.
1. Used as lubricant.
2. Used as a wax.

3. Used as a baby powder.

4. Used as a sealant.

While the foregoing is directed to various embodiments of the present invention, other and further embodiments of the invention may be devised without departing from the basic scope thereof, and the scope thereof is determined by the claims which follow.

What is claimed is:

1. A process for producing a degraded derivative tetrafluoroethylene product with enhanced crystallinity comprising the steps of:
   heating a batch of tetrafluoroethylene material in an environment with a temperature of between 1000 degrees Fahrenheit and 2000 degrees Fahrenheit;
   removing a tetrafluoroethylene-derived material from the environment as said material passes from a solid to a liquid phase; and
   allowing the tetrafluoroethylene material to re-solidify.

2. The process of claim 1 wherein the tetrafluoroethylene material is sintered.

3. The process of claim 1 wherein the tetrafluoroethylene material is un-sintered.

4. The process of claim 1 wherein the tetrafluoroethylene material is not pure tetrafluoroethylene.

5. The process of claim 1 wherein the tetrafluoroethylene material is pure tetrafluoroethylene.

6. The process of claim 1 wherein the temperature of the environment is 1000 degrees Fahrenheit to 1900 degrees Fahrenheit.

7. The process of claim 1 wherein the temperature of the environment is 1400 degrees Fahrenheit to 1700 degrees Fahrenheit.

8. The process of claim 1 wherein the temperature of the environment is 1500 degrees Fahrenheit.

9. The process of claim 1 wherein the degraded derivative tetrafluoroethylene product is removed when it is a liquid.

10. The process of claim 1 wherein the degraded derivative tetrafluoroethylene product is removed as it becomes a liquid.

11. The process of claim 1 wherein the solidified degraded derivative tetrafluoroethylene product is formed into a shape.

12. The process of claim 1 wherein the solidified degraded derivative tetrafluoroethylene product is ground.

13. The process of claim 11 wherein the formed degraded derivative tetrafluoroethylene product is compressed.

14. The process of claim 11 wherein the solidified degraded derivative.

15. The process of claim 1 wherein the degraded derivative tetrafluoroethylene product has a heat of fusion of 50.0 Joules/gram to 75.0 Joules/gram.

16. The process of claim 1 wherein the degraded derivative tetrafluoroethylene product has a heat of fusion of 50.0 Joules/gram to 65.0 Joules/gram.

17. The process of claim 1 wherein the degraded derivative tetrafluoroethylene product has a heat of fusion of 60 Joules/gram to 75 Joules/gram.

18. The process of claim 1 wherein the degraded derivative tetrafluoroethylene product is granular.

19. The process of claim 1 wherein the degraded derivative tetrafluoroethylene product is a plug.

20. The process of claim 1 wherein the resulting degraded derivative tetrafluoroethylene product is either pure white or not pure white.

21. The process of claim 1 wherein the degraded derivative tetrafluoroethylene product has enhanced lubricity.

22. The process of claim 21 wherein the enhanced lubricity is seven points above that of standard PTFE stock.

23. A process for the formation of a submicron particle size derivative tetrafluoroethylene product comprising the steps:
   melting at least a portion of a batch of tetrafluoroethylene;
   collecting at least a portion of the batch as said at least a portion passes from a solid to a liquid phase;
   cooling at least a portion of the batch; and
   grinding at least a portion of the batch to a submicron particle size.

24. The process of claim 23 wherein the step of melting at least a portion occurs in an environment that is at a temperature of 1000° F. to 2000° F.

25. The process of claim 23 wherein the step of melting at least a portion of the batch occurs in an environment that is at a temperature of 1200° F. to 1700° F.

26. The process of claim 23 wherein the step of melting at least a portion of the batch occurs in an environment that is at a temperature of 1500° F.

27. The process of claims 23, 24, 25, or 26 wherein at least a portion of the batch melting is at least partially in contact with aluminum.

28. The process of claim 23 wherein the tetrafluoroethylene material is sintered.

29. The process of claim 23 wherein the tetrafluoroethylene material is either pure or not pure tetrafluoroethylene.

30. The process of claim 23 wherein the degraded derivative tetrafluoroethylene product has a heat of fusion of 50.0 Joules/gram to 75.0 Joules/gram.

31. The process of claim 23 wherein the degraded derivative tetrafluoroethylene product has a heat of fusion of 50.0 Joules/gram to 65.0 Joules/gram.

32. The process of claim 23 wherein the degraded derivative tetrafluoroethylene product has a heat of fusion of 60 Joules/gram to 75 Joules/gram.

33. A product manufactured by using the process of:
   heating solid tetrafluoroethylene material in an environment with a temperature of between 1000 degrees Fahrenheit and 2000 degrees Fahrenheit;
   removing at least a portion of said tetrafluoroethylene material from the environment as said at least a portion passes from a solid to a liquid phase; and
   allowing the liquid tetrafluoroethylene material to re-solidify.

34. A product manufactured by using the process of:
   melting at least a portion of a batch of tetrafluoroethylene;
   collecting at least a portion of the batch as said at least a portion passes from a solid to a liquid phase;
   cooling at least a portion of the batch; and
   grinding at least a portion of the cooled batch to a submicron particle size.

35. The process of claim 1 wherein said process has a duration in time and wherein said duration for producing said degraded derivative tetrafluoroethylene product is inversely proportional to the temperature for heating said tetrafluoroethylene material, such that the time for the conversion of tetrafluoroethylene to a degraded derivative tetrafluoroethylene product is longer for lower temperatures and said time is shorter for higher temperatures.

36. The process of claim 1 wherein said process occurs in a structure comprised of a metal material, and wherein said metal material acts as a thin film catalyst for the conversion of material to a degraded derivative tetrafluoroethylene product.

37. The process of claim 1 wherein said degraded derivative tetrafluoroethylene product has an enhanced lubricity above that of standard PTFE.

38. The process of claim 1 wherein the batch of tetrafluoroethylene material is comprised of tetrafluoroethylene and at least one other material.

39. The process of claim 23 wherein the batch of tetrafluoroethylene material is comprised of at least one other material.

* * * * *